US007284936B1

(12) United States Patent
Rinner

(10) Patent No.: US 7,284,936 B1
(45) Date of Patent: Oct. 23, 2007

(54) TOOL BIT AND COLLET ASSEMBLY AND METHOD

(75) Inventor: James A. Rinner, Racine, WI (US)

(73) Assignee: Teleflex Medical Incorporated, Limerick, PA (US)

( * ) Notice: Subject to any disclaimer, the term of this patent is extended or adjusted under 35 U.S.C. 154(b) by 724 days.

(21) Appl. No.: 10/831,094

(22) Filed: Apr. 26, 2004

(51) Int. Cl.
*B23B 31/117* (2006.01)
*B23B 31/12* (2006.01)

(52) U.S. Cl. .......................... 408/240; 279/29; 279/74; 279/146

(58) Field of Classification Search ................ 408/240, 408/239 R, 239 A; 279/29, 74, 122, 146, 279/82, 904
See application file for complete search history.

(56) References Cited

U.S. PATENT DOCUMENTS 799,787 A 9/1905 Gessert
2,926,020 A 2/1960 Dayton
3,240,520 A 3/1966 Dailey
3,583,715 A 6/1971 Jahrl
3,595,593 A * 7/1971 Gold ........................... 279/47
3,758,125 A * 9/1973 Cornelia ..................... 279/103
4,413,937 A * 11/1983 Gutsche .................. 408/239 A
4,514,117 A 4/1985 Scott
4,668,138 A * 5/1987 Carter ......................... 409/234
4,735,529 A * 4/1988 Short .......................... 408/225
5,337,634 A * 8/1994 Carnesi ....................... 81/128
5,820,136 A * 10/1998 Han et al. ................... 279/131
6,053,675 A 4/2000 Holland
6,179,302 B1 1/2001 Gauthier
6,457,916 B2 10/2002 Wienhold
6,722,667 B2 * 4/2004 Cantlon ....................... 279/22
2001/0042964 A1 11/2001 Bedi et al.

* cited by examiner

*Primary Examiner*—Willmon Fridie, Jr.
(74) *Attorney, Agent, or Firm*—Baker & Hostetler LLP

(57) ABSTRACT

A tool bit and collet assembly, and method of assembling, wherein there is a collar for holding the collet in the radially inward position to thereby hold the tool bit. Camming surfaces are between the tool bit and the collet, and between the collet and the collar, for opening the collet upon insertion the tool bit into the collet, and thereby move the collar to the opening position.

15 Claims, 3 Drawing Sheets

TOOL BIT AND COLLET ASSEMBLY AND METHOD

This invention pertains to a tool bit and collet assembly and a method of arranging the two in assembled working relationship. More particularly, the assembly is accomplished by having the tool bit activate the collet to open the collet for reception of the tool bit and to then have the collet close on the tool bit for axially restraining the tool bit in the collet.

BACKGROUND OF THE INVENTION

Assemblies of tool bits and collets are well known in the prior art. That art also is aware of having the tool bit activate the collet for opening the collet to receive the tool bit and then axially restrain the tool bit in the collet. Those arrangements commonly employ a collet having a ball and a tool bit having a groove which receives the ball for providing axial restraint of the tool bit in the collet. Also, there is a spring-urged collar which forces the ball into the groove.

That prior art of course requires that there be a ball, and that the ball be under the control of the collet and the collar. In that arrangement, there must not only be a ball, but the collet must be arranged to hold the ball for placement into the groove. That ball, collet, and groove assembly requires those special parts and special assembly process steps to achieve the assembly where the ball is employed.

The present invention improves upon the prior art by having a tool bit that activates a collet to open the collet and thereby receive the tool bit and to then have the collet close onto the tool bit, and the tool bit is then restrained both rotationally and axially relative to the collet, all without a ball and with fixed surfaces axially restraining the tool bit. To achieve this improvement, the tool bit and collet have camming surfaces which are interengaged upon insertion of the tool bit into the collet for expanding the collet into the tool bit receptive mode. Of course, that is accomplished without the need for those specially dimensioned and hardened balls, and without the need for controlling the balls, such as when assembling the parts together.

Additionally, the present invention provides for automatic retraction of the collet-holding collar, and that is achieved simply upon, and at the time of, insertion of the tool bit into the collet. There can be fixed surfaces on the tool bit and the collet and the collar, rather than loose and movable balls, all of which act as camming surfaces to perform the functions mentioned above.

Still further, in the axial restraint of the tool bit in the collet, there is no need to utilize or rely upon movable balls for that restraint, Instead, there are fixed surfaces on the tool bit and the collet for that function, and thus the restraint is more accurate and reliable compared to the prior art tool bit holders.

A method for arranging the tool bit and collet in an assembled relationship is also included in this invention. Opening the collet, and the release of the collet holding collar, and the closing of the collar onto the collet are all achieved by surfaces respectively fixed on those moving parts, and moving against each other, in response to the one action of the insertion of the tool bit into the collet.

DETAILED DESCRIPTION OF THE ASSEMBLY AND METHOD

Figures 1, 2, 3, 4, 12:
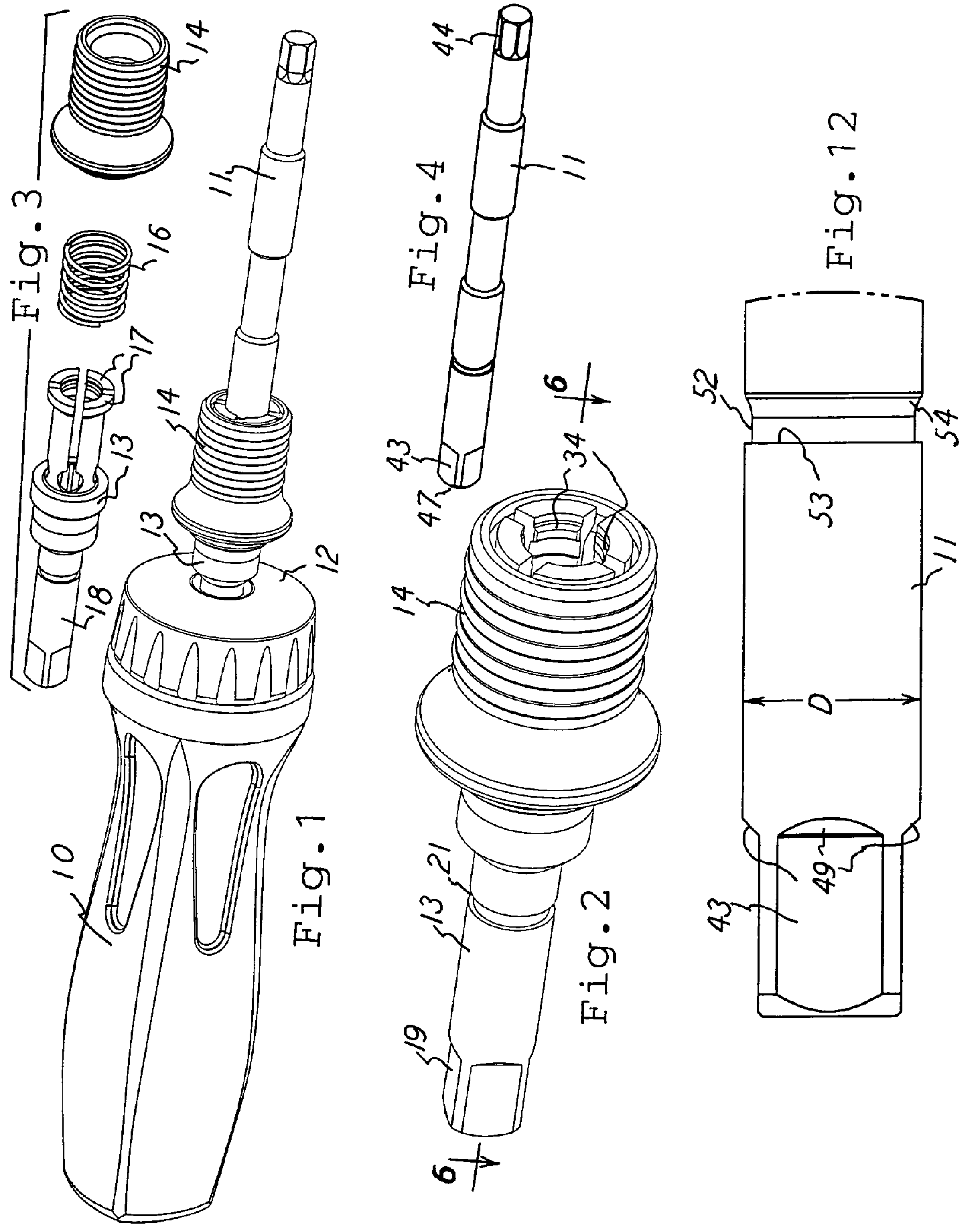
FIG. 1 is a perspective view of the collet and tool bit assembly with a handle attached thereto.
FIG. 2 is an enlarged perspective view of a portion of FIG. 1.
FIG. 3 is an exploded perspective view of portions of FIG. 1.
FIG. 4 is a full-body perspective view of the tool bit shown in FIG. 1.
FIG. 12 is an enlarged side elevational view of the left end of the tool bit shown in FIG. 4.

FIG. 1 shows the assembly of an entire tool which includes an ergonomically shaped handle 10 and a driven tool bit 11. The handle is elongated, and there may be an unshown ratchet connection between the handle 10 and the bit 11. That unshown connection could be conventional for the well-known purpose of rotating the assembly in both directions of rotation for the usual respective left and right hand action. A right and left hand selector cap 12 is shown on the handle 10, and that is fully understood by one skilled in the art. In the showing and description hereafter, the ratcheting feature is not shown. An elongated axis A extends centrally of the tool assembly.

FIG. 2 shows a collet 13 and a collar 14 extending axially thereover, with both parts being aligned on axis A. FIG. 4 shows that the tool bit 11 which, as seen in FIG. 1, fits inside the collet 13 and extends along the axis A. FIG. 3 shows the full view of the collet 13, and a helical compression spring 16 is interposed between the collet 13 and the collar 14 for urging the collar 14 axially rightward, as viewed, and relative to the axial location of the collet 13 to thereby close the collet 13 on the tool bit 11.

The collet 13 includes spring fingers 17 and a body portion 18 which is shown to be the stud 18 integral with the spring fingers 17. The stud 18 can have the flat sided end 19 for direct drive relationship with the interior of the handle 10, in any known and suitable polygonal arrangement. Thus, the handle 10 and the collet 13 rotate in unison, at least where there is no ratchet connection therebetween. Also, in any conventional arrangement, the collet 13 is axially fixed with the handle 10 in the assembled position shown, such as with a snap ring groove 21.

Figure 5:
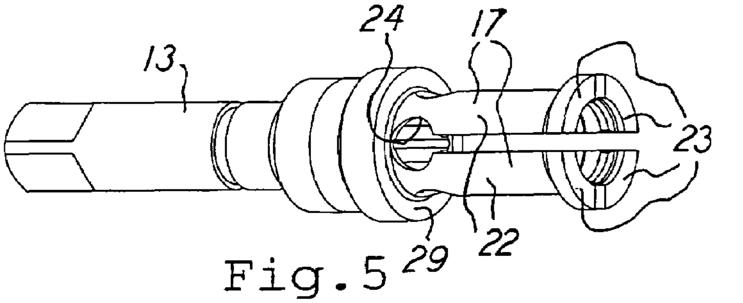
FIG. 5 is an enlarged view of the collet shown in FIG. 3.
Figure 9:
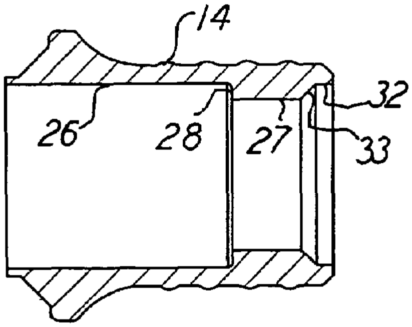
FIG. 9 is an enlarged longitudinal sectional view of the collar shown in FIG. 2.

The collet 13 has each of the four spring fingers 17 of spring material and occupying approximately a quarter arc in axial end view, such as in FIG. 5. Each finger 17 includes a flexible base length 22 and an integral enlarged and radially extending end knob 23. Between the collet body 18 and each of the fingers 17 there is a relief 24 for enhancing the radial spring action of the fingers 17. Thus, the fingers 17 can move radially between the FIG. 6 and FIG. 7 positions, namely the respective closed and open positions. The spring effect is such that the fingers 17 are normally in the FIG. 7 open position. Of course, the collar 14 slides axially over the fingers 17 to position the fingers 17 in the FIG. 6 closed position. The collar 14 is cylindrical and is aligned on the axis A and has cylindrical and longitudinal openings 26 and 27 extending therethrough with a circular shoulder 28 therebetween. The several fingers 17 are also basically in a cylindrical pattern.

The collet 13 has a circular shoulder 29 facing the collar shoulder 28, and the spring 16 is disposed between the two shoulders 28 and 29 for urging the collar to the right, as view herein. Of course the collar 14 is accessible to the tool user so that the collar can be slid to the left against the force of the spring 16 to be free from radially inwardly forcing on the spring fingers 17, and that would be to the collet open position of FIG. 7.

Figure 6:
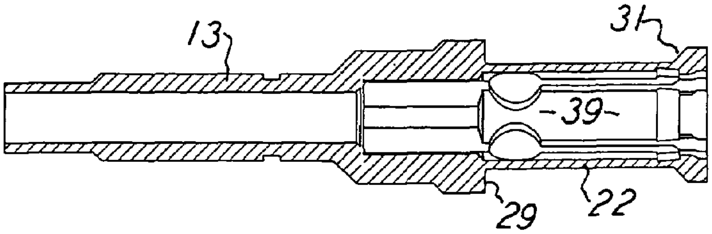
FIG. 6 is a modified sectional view on 6-6 of FIG. 2.

Each of the four collet knobs has a surface 31 disposed at an oblique angle to the axis A and facing to the left, as viewed herein. The angle is shown to be forty-five degrees, and together, in their shown end-to-end relationship, the knobs present substantially an angulated annular surface which is a camming, or wedge, surface, as mentioned again later. Those surfaces 31 extend radially beyond the accumulated outer circumference presented by the spring finger bodies 21, as seen in FIG. 6.

The collar 14 also has a cylindrical opening 32, which is shown to have the diameter of the opening 26. An angulated surface 33 extends circularly between the openings 27 and 32. The collar surface 33 is a camming or wedge surface, and it is of a circular configuration, whereas the camming surface 31 is radially variable due to the flexing of the supporting finger portions 21. The two surfaces, as being defined and described herein, are mating and matching surfaces and are preferably of the same oblique angulation relative to the axis A. Also, the surfaces 32 and 33 are integral, and therefore fixed, with the respective collet 13 and collar 14.

Figure 8:
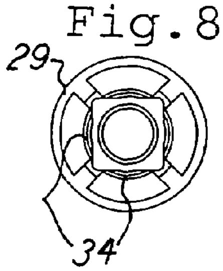
FIG. 8 is an end elevational view of FIG. 7.
Figure 11:
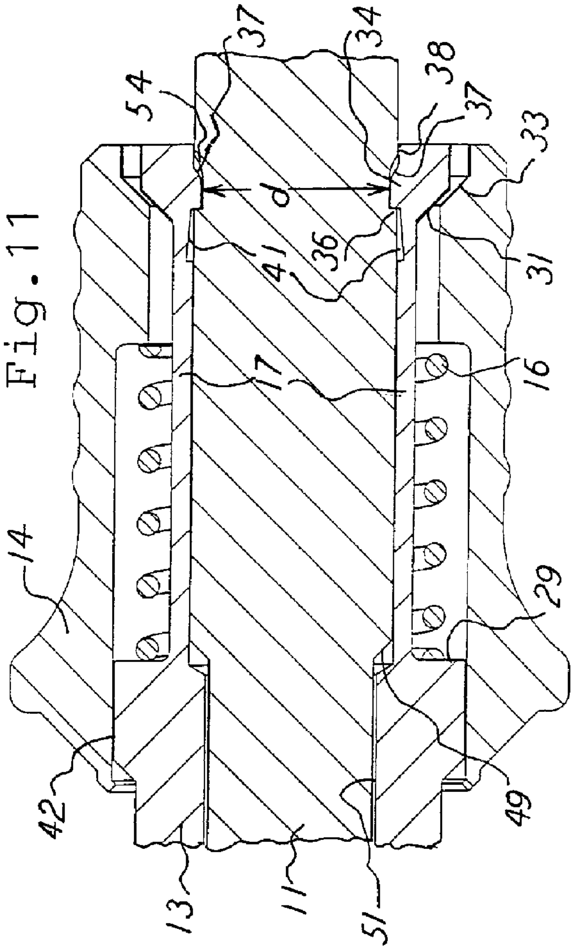
FIG. 11 is and enlarged longitudinal sectional view of a portion of FIG. 10, with a portion of the tool bit added thereto.

Each of the arcuate interiors as presented by the knobs 23 has a radially inward projecting portion 34 in the form of a quarter arc, such as seen in FIGS. 2, 8 and 11. Those portions 34 substantially present a radially inward projecting circular tongue on the interior of the collet 13. Each of the portions 34 has a right-angled shoulder 36 and an obliquely extending surface 37. Each finger 17 axially terminates in a cylindrical portion 38. The internal diameter of the portion 38 is greater that the internal dimension of the projections 37, so the projections project radially inward into the central opening 39 of the collet and the projections 34 present the most radially inward projection, and thus a collet circular tongue at that right end, as viewed in the drawings, such as seen in FIG. 11.

Adjacent the projection 34, the collet fingers each have an arcuate recess 41, and that further defines the shoulder 36, as seen in FIG. 11. The drawings also show that the collar 14 is slideably mounted on the collet, such as at the respective cylindrical telescoping collar and collet surfaces at 42 in FIG. 11. With force from either the user's hand or the spring 16, or the novel action hereinafter described, the collar can be slid axially and thereby control the radial opening and closing of the collet, for the subsequent control of the tool bit 11.

Figure 10:
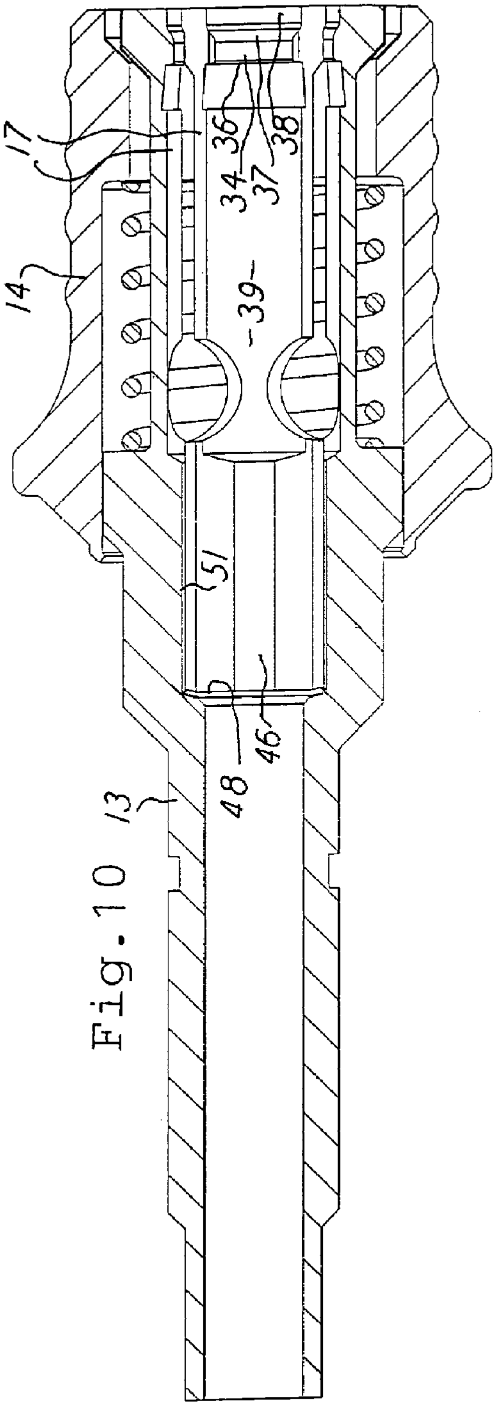
FIG. 10 is an enlarged longitudinal sectional view of the assembled parts of FIG. 3, such as along 6-6 of FIG. 2.

The tool bit 11 can be inserted into the collet opening 39, such as to the position shown in FIG. 11. The tool bit 11 is shown in FIG. 4 to have a polygonal end 43 and a work-engaging end 44. The end 43 is in rotation drive relationship with the collet polygonal interior 46 shown in FIG. 10. In that arrangement, the tool bit 11 is rotatably driven on the axis A by the handle 10 and the collet 13. The tool bit terminal surface 47 can abut the collet internal annular shoulder 48 to thereby axially position the tool bit 11 relative to the collet 13 along the axis A.

The tool bit 11 has a circular groove 52 therearound, and the groove 52 can be positioned to align with the tongue 34, as in FIG. 11, and thereby secure the tool bit 11 axially relative to the collet 13, as desired. The groove 52 has a right-angled shoulder 53 facing outward to the right, as viewed, and it is in full right-angle contact with shoulder 36, and that firmly holds the tool bit 11 axially in the collet 13. Also, the tool bit 11 has conical surface 54 adjacent the groove 52, and that accommodates the tongue 34 in the FIG. 11 assembly.

FIG. 12 shows angulated surfaces 49 on the tool bit 11, a total of four surfaces 49 are there, and those surfaces present a cam or wedge, as described later. The cam or wedge 49 is operative when the tool bit is inserted into the collet opening 39, as described later. Of course, the cam or wedge 49 could be one continuous conical surface encircling the tool bit 11 instead of the shown separated surfaces 49.

Figure 7:
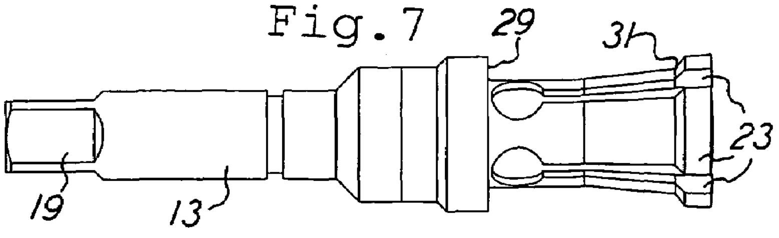
FIG. 7 is a side elevational of the collet of FIG. 5, but with the collet fingers in the open position.

The tool bit 11 fits telescopically snugly within the collet 13 at the polygonal connection at 51, as mentioned and as seen in FIG. 11. Beyond the tool bit polygonal end 43, the tool bit 11 is cylindrical in its length and has a diameter D for a portion of its length, and that tool portion is, when in the complete tool assembly, surrounded by the collet fingers 17. The diameter D presents a cross sectional girth greater than that of the tool bit portion 43, as seen in FIG. 12. The outer diameter D is also larger than an inner diameter d at the tongue portion 34 of the collet 13. That is, upon inserting the tool bit 11 into the collet opening 39, the cam 49 of the tool bit 11 will engage the tongue portions 34, such as at the angulation 37, and, particularly with the two angulations at 49 and 37 being substantially the same, the collet fingers will be urged radially outward to the open position such as in FIG. 7. Continued insertion of the tool bit 11 will cause the diameter D to slide onto the collet tongue 34 to place the spring fingers 17 in the open positions, such as seen in FIG. 7.

So, upon inserting the tool bit 11 into the collet opening 39, the tool bit camming surface 49 abuts the collet tongue 34 and thereby forces the collet fingers 17 radially outward to the open position. In that spring finger opening action, the collet camming surface 31 engages the collar camming surface 33 and thereby urges the collar 14 to the left, as viewed, and that releases the radially inward force that the collar 14 normally applies on the collet fingers 17 to close the collet onto the tool bit 11 and thereby secure the tool bit 11 in the assembly.

Thus, the structure and the assembly method have been described. There is application of integral portions, namely the camming or wedge surfaces, rather than separate parts such as balls, on the collet fingers and on the collar, and therebetween, for the opening action. Of course the tool bit can be in kit form wherein there are a plurality of the bits 11 of varying structures and which are easily and readily inserted and removed relative to the collet 13. The groove 52 will securely axially hold the tongue 34 in the assembled position of FIG. 11. Also, the tool bit 11 has the angulated relief 38 to receive the tongue 34 and its angulation 37.

To release the tool bit 11 from the collet 13, the user will simply move the collar 14 leftward and the spring fingers 17 will then assume their free body positions to the open positions beyond contact with the tool bit 11. In actual use, there will be a sound, in the nature of a clicking, when the tool bit is inserted into the opening 39 and to the fully seated position. The signal will come when the tool bit is fully seated, and the sound is the tongue hitting against the tool bit in the groove 52 when the tongue 34 snaps into the groove 52.

The method of assembling the complete tool is described in the foregoing, particularly utilizing the camming surfaces described to cause the collet to open to receive the tool bit 11 and to then close onto the tool bit 11 in the operating condition shown in FIG. 11. The tongue 34 and the groove 52 serve as a detent connection, and the tool bit can be provided with any enlarged part arranged to radially open the spring fingers 17. There is no intervening separate part between the collar and the collet for opening the spring fingers nor for axially holding the tool bit when it is in the FIG. 11 fully seated position. With the camming surfaces disclosed, the collet is automatically opened and closed with the respective insertion of the tool bit and the action of the spring 16. The user need not manually slide the collar 14.

What is claimed is:

1. A tool bit and a collet comprising:

a handle having an axis and an elongated opening extending along said axis, a collet disposed in said opening and having spring fingers disposed and being spring-urged radially outward from said axis in a first position and defining an elongated bore extending along said axis for receiving said tool bit and with said collet bore having a tool bit entrance end in said bore, a collar telescopically slideable on said collet for urging said spring fingers radially inward toward said axis in a second position, said spring fingers and said collar having mutually matching camming surfaces obliquely angulated relative to said axis and contactable with each other upon telescopically sliding of said collar in a first direction along said axis and toward said bore entrance end for urging said spring fingers to said second position, a spring operative on said collar for telescopically sliding said collar in the direction of said bore entrance end and for placing said camming surfaces in contact with each other and for also placing said spring fingers in said second position, said camming surfaces being arranged to move said collar in a second direction along said axis and away from said bore entrance end upon sliding contact of said camming surfaces with each other and thereby have said spring fingers positioned in said first position, said tool bit being insertable into said bore entrance end, said collet and said tool bit having engageable rotationally driving engageable surfaces for transmitting rotation from said collet to said tool bit, said tool bit and said spring fingers having mutually engageable surfaces for placing said camming surfaces into contact with each other and thereby radially moving said spring fingers radially outward to said first position upon insertion of said tool bit into said bore entrance end for moving said collar in said first direction and thereby away from said bore entrance end in a tool bit receiving mode, and said tool bit and said spring fingers having respective portions axially engageable upon radially inward movement of said spring fingers to said second position for axially restraining said tool bit relative to said collet in a tool bit axially secured mode.

2. The tool bit and collet, as claimed in claim 1, wherein:

said tool bit and spring fingers respective portions are an integral projection and recess connection which mate with each other upon insertion of said tool bit into said bore and against said interior stop.

3. The tool bit and collet, as claimed in claim 2, wherein:

said respective portions are an annular tongue extending around said spring fingers and a groove extending around said tool bit.

4. The tool bit and collet, as claimed in claim 3, wherein:

said tool bit has an outer diameter and said spring fingers presents an inner diameter which is defined by said annular tongue and with said diameters being of dimensions to be in interference fit relative to each other before said tool bit is inserted into said bore, and said tool bit outer diameter circularly engages said spring fingers tongue upon insertion of said tool bit into said bore for moving said spring fingers to said first position.

5. The tool bit and collet, as claimed in claim 4, including:

said tool bit having a camming surface disposed in contact with said annular tongue upon insertion of said tool bit into said bore for moving said spring fingers into said first position.

6. The tool bit and collet, as claimed in claim 4, wherein:

said groove is defined by an annular shoulder extending around said tool bit and being perpendicular to said axis and facing in said opposite direction for axial abutting engagement with said tongue.

7. The tool bit and collet, as claimed in claim 4, wherein:

said tongue and said tool bit being operatively associated to have said spring fingers impact against said tool bit when said spring fingers move from said first position to said second position, and thereby create a clicking sound to indicate that said tool bit is positioned against said internal stop.

8. In a tool bit and collet assembly including an elongated collet having a central axis and a collet bore extending along said axis for the reception of said tool bit, and with said collet having spring fingers movable radially to said axis and being disposed in a first position radially outward relative to said axis, and having a collar telescopically movable in a direction along said axis on said collet and being radially engageable with said spring fingers for moving said spring fingers toward said axis to a second position radially inward relative to said axis, and including a spring for telescopically moving said collar in said direction, and having an elongated tool bit, and there is a rotational drive connection between said collet and said tool bit, the improvement comprising:

first camming surfaces on said tool bit and said spring fingers for mutual engagement of said first camming surfaces upon insertion of said tool bit into said bore and thereby have said spring fingers move radially outward to said first position, second camming surfaces on said spring fingers and said collar and engageable upon said radially outward movement of said spring fingers to said first position for axial movement of said collar opposite to said direction, and a detent connection affixed respectively to both said tool bit and said spring fingers for interengagement upon insertion of said tool bit into said bore and to thereby preclude movement of said tool bit in said direction and out of said bore.

9. The tool bit and collet assembly, as claimed in claim 8, wherein:

said detent connection is comprised of a tongue affixed to said spring fingers and a groove on said tool bit and with said tongue and said groove mated together in engagement upon insertion of said tool bit into said bore.

10. The tool bit and collet assembly, as claimed in claim 9, wherein:

said tongue is in the form of an annular projection extending around said bore and on said spring fingers.

11. The tool bit and collet assembly, as claimed in claim 9, wherein:

said camming surface on said spring fingers is on said tongue and is faced toward said direction to thereby move said spring fingers radially outward upon insertion of said tool bit into said bore.

12. The tool bit and collet assembly, as claimed in claim 8, wherein:

said collet has an end wall at the interior of said bore and said tool bit abuts said end wall when said detent connection is engaged.

13. In a method of forming an assembly, and thereby placing into rotational drive relationship, a tool bit and a collet, wherein said collet has spring fingers and an elongated axis and defining a cylindrical bore extending along said axis for receiving said tool bit, and with said spring fingers being movable toward and away from said axis, and having a collar movable on said spring fingers in a direction along said axis for moving said spring fingers toward said axis, an improvement comprising the steps of:

forming an annular groove on said tool bit, forming substantially an annular tongue on said spring fingers and having said tongue extend circularly around said bore and project radially inward relative to said axis and having said tongue arranged for connecting with said groove upon insertion of said tool bit into said bore and thereby restrict movement of said tool bit along said axis, and arranging said tool bit with a camming surface engageable with said annular tongue upon insertion of said tool bit into said bore for moving said spring fingers away from said axis for the reception of said tool bit into said bore.

14. In the method of forming an assembly, as claimed in claim 13, the further step comprising:

forming camming surfaces on said spring fingers and said collar for sliding engagement of the latter said camming surfaces upon insertion of said tool bit into said bore and thereby move said collar along said axis opposite said direction to thereby have said spring fingers move away from said axis for reception of said tool bit.

15. In the method of forming an assembly, as claimed in claim 12, the further step comprising:

forming a stop on said collet and engaging said tool bit with said stop for limiting the amount of insertion of said tool bit into said bore and thereby axial restrain said tool bit in said collet.

* * * * *